United States Patent Office 3,372,133
Patented Mar. 5, 1968

3,372,133
PROCESS FOR PRODUCING ORGANO-
POLYSILOXANES
Karl W. Krantz, Schenectady, N.Y., assignor to General
Electric Company, a corporation of New York
No Drawing. Filed June 23, 1965, Ser. No. 466,468
8 Claims. (Cl. 260—28)

ABSTRACT OF THE DISCLOSURE

Phenylsilsesquioxane polymers of high intrinsic viscosity are prepared by the suspension polymerization of lower molecular weight precursor materials in the presence of a high boiling aromatic solvent for both the precursors and the final materials and in the presence of controlled amounts of a high boiling aliphatic diluent which has a solvent attraction for the aromatic solvent but not towards the organopolysiloxanes. The resulting high intrinsic viscosity materials are useful as wire insulation, thin films, textile treating materials and the like.

---

This application relates to a process for producing organopolysiloxanes. More particularly, it is directed to a process for making soluble high molecular weight organopolysiloxanes containing an average of from 1.0 to 1.1 silicon-bonded organic groups per silicon atom and composed of from 90 to 100 mol percent of organosiloxy units of the formula:

(1)  $RSiO_{3/2}$ where R is an aryl radical, the remaining organosiloxy units, if any, being selected from the class consisting of organosiloxy groups of the formula:

$R'R''SiO$, $R'[CN(CH_2)_m]SiO$, $R'''SiO_{3/2}$, and
$CN(CH_2)_m SiO_{3/2}$ where R' and R" are selected from the class consisting of aryl radicals, alkyl radicals, and alkenyl radicals, R''' is a lower alkyl radical of from 1 to 4 carbon atoms, and m is an integral number from 2 to 4, inclusive, where the organopolysiloxane has an intrinsic viscosity in benzene at 25° C. of at least 0.4 dl./g. Still more particularly, this invention relates to such a process where a low molecular weight siloxane raw material is dissolved in a solvent and mixed with a siloxane rearrangement and condensation catalyst, the solution heated, and a quantity of non-solvent diluent added incrementally to form a suspension and effect an increase in the effective concentration of the siloxane material in the solvent.

Among the aryl radicals represented by R in the above formulas are, for example, phenyl, cyanophenyl, benzoylphenyl, tolyl, xylyl, ethylphenyl, naphthoyl, biphenyl, anthracyl, phenoxyphenyl, toloxyphenyl, etc. The aryl radicals which R' and R" represent can be selected from the same group, the alkyl radicals can be, for example, methyl, ethyl, propyl, isopropyl, butyl, cyclopentyl, cyclohexyl, etc.; and the alkenyl radicals are, for example, vinyl, allyl, methallyl, cyclohexenyl, etc. The R''' radicals can be, for example, methyl, ethyl, propyl, butyl, etc.

Arylsilsesquioxane polymers composed of from 90 to 100 mol percent of recurring units of Formula 1 are distinguished by their structure which resembles that of a ladder. The arrangement of the units may be represented as:

(2) 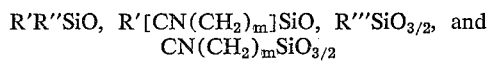

The polymers are thus characterized by recurring units of the formula:

(3) 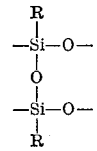

Therefore, they may be called arylsilsesquioxane ladder polymers, and the term ladder polymer will be used throughout this specification to describe the polymers of the present invention, including the copolymeric materials which contain from 0 to 10% of other siloxy units.

Methods for forming ladder polymers having intrinsic viscosities of at least 0.4 dl./g. in benzene at 25° C. have been described in the prior art. For example, in U.S. Patent 3,017,386 of John F. Brown, Jr., and Lester H. Vogt, polymerization of a ladder prepolymer is accomplished in the presence of a solvent, in preferred concentrations, and a basic catalyst, e.g., an alkali metal hydroxide or silanolate. It is often difficult to predict the final intrinsic viscosity which will be obtained by that process.

In U.S. Patent 3,162,614 of Arthur Katchman it is disclosed that a more heat stable ladder polymer can be formed when the starting material is octaphenylsilsesquioxane [$(C_6H_5SiO_{3/2})_8$, also referred to as $T_8$]. However, while the polymers formed in that patent were shown to be more heat stable, the problem of forming higher molecular weight, that is, higher intrinsic viscosity, polymers is still present as shown by the intrinsic viscosity of the polymers produced. In another patent, U.S. 3,175,994 of Arthur Katchman and Glenn D. Cooper, a method for preparing higher molecular weight ladder polymers utilizing sulfoxide or sulfone-containing materials is described. These materials do permit attaining a higher intrinsic viscosity in a shorter period of time, but the ultimate intrinsic viscosity is somewhat lower than might be desired in some cases. Predictability of the final intrinsic viscosity is enhanced by the use of the formula shown in that patent and more distinctly set forth in the copending application of Arthur Katchman and Kenneth M. Kiser, Ser. No. 175,286, filed Feb. 23, 1962, now Patent No. 3,234,179 assigned to the same assignee as the present invention.

Unexpectedly, I have discovered that by a suspension polymerization of the prepolymer described in the aforementioned Brown and Vogt patent, and referred to in the just mentioned patent of Katchman and Cooper, it is possible to obtain ladder polymers with a predictable intrinsic viscosity over a broader range, and in a shorter period of time. The essence of the suspension polymerization is that a non-solvent diluent is gradually added to a solvent solution of the prepolymer, giving rise to a two-phase system and, in effect, removing a portion of the solvent from the polymer-rich phase, thus increasing the concentration of the polymerizing ladder polymer in the polymer-rich phase during the course of the polymerization. While the ranges of solvent and diluent and the particular solvent and diluent utilized are not critical, per se, they become important in accurately predicting the final viscosity of the polymer obtained. Further, not only can the aforementioned prepolymers be utilized in this process, but the octaphenylsilsesquioxane, as utilized in Katchman Patent 3,162,614, can also be employed as can hydrolyzates of trifunctional aryl silanes, such as phenyl trichlorosilane, either alone or with up to 10% mol percent of at least one silane selected from the class consisting of R'R"SiCl$_2$, R'[CN(CH$_2$)$_m$]SiCl$_2$, R'''SiCl$_3$, and CN(CH$_2$)$_m$SiCl$_3$, where R', R", R''', and $m$ are as previously defined. In some cases these materials are contained in a low boiling solvent solution which can be present in an amount of up to 10 parts per part of low molecular weight polysiloxane, by weight.

The prepolymer to be utilized, which includes both homopolymers of the arylsilsesquioxane and copolymers of the arylsilsesquioxane with the other groups previously described, is preferably, but not essentially, free of silicon-bonded hydroxyl groups. Several methods of preparing the prepolymer and formulations of the ultimate prepolymer are fully set forth in the aforementioned Katchman and Cooper Patent 3,175,994, and that portion of this patent is incorporated into this disclosure, by reference.

Among the basic siloxane rearrangement and condensation catalysts which can be employed in the process of the present invention are, for example, alkali metal hydroxides, alkali metal silanolates, for example, the potassium salt of methyl silanetriol, the potassium salt of phenyl silanetriol, etc., either alone or in the form of an alcohol solution, such as a methanol solution. The amount of catalyst which is employed can also be widely varied, but is advantageously in the range of from about 0.001% to 0.5%, or more, by weight, based on the weight of the material undergoing treatment.

Aryl ladder polymers having intrinsic viscosities above about 1.5 dl./g. are tough film-forming materials. There is a gradual increase in toughness up to about 4.0 dl./g. where the solution viscosity increases to such an extent that there is often little benefit in further polymerization. The suspension polymerization of the present invention allows control within this particularly desirable range or, in those cases where it is otherwise desirable, allows the production in a short time of ladder polymers having intrinsic viscosities between 0.4 and 1.5 or significantly above 4.0 dl./g. Further, the suspension polymerization allows the mechanical convenience of easier handling and easier recovery, the polymer being recovered as a uniform, free-flowing powder. In general, the polymer is recovered from the bulk polymerization in conglomerate form and must be ground, prior to use. Thus, not only is the grinding step eliminated, but the attendant static build up problems of grinding are eliminated.

The suspension polymerization process of the present invention can be summarized as follows:

(1) Addition to a prepolymer, hydrolyzate, or low molecular weight arylsilsesquioxane polymer of a high boiling solvent and a basic siloxane rearrangement and condensation catalyst.

(2) Removal of the low boiling solvent used in the preparation of the prepolymer or hydrolyzate, if still present, by distillation.

(3) Addition of a diluent, at a predetermined rate, to the prepolymer or hydrolyzate solution to gradually remove the high-boiling solvent from the polymer macromolecules, by virtue of a redistribution of this solvent between the polymer-rich phase and the separate, diluent-rich phase.

(4) Polymerization of the prepolymer to a higher ladder polymer by continued heating and stirring with the gradual addition of additional diluent for a selected time period.

The particular aspects of this process will now be described in greater detail.

A variety of solvents can be used for this suspension polymerization process. In general, these materials are aromatic in character and possess a solvent attraction for the low molecular weight ladder prepolymer or hydrolyzate and the higher molecular weight ladder polymer, particularly at higher temperatures. Additionally, these materials must be susceptible to solution by the subsequently added diluent, which will be described in greater detail later, and they must be inert to the other components of the composition under the conditions of polymerization. Both characteristics must be present for proper functioning of the process of the present invention. The solvent materials have boiling points of at least 200° C. and maximum melting points of 100° C. Included among the solvents which can be utilized are benzophenone, biphenyl, diphenylether, alkylphenylketones where the alkyl group is from one to seven carbon atoms, alkoxy derivatives of any of these, dibenzofuran, and naphthalene. The preferred high boiling solvents are benzophenone, biphenyl, and diphenylether. The ultimate intrinsic viscosity of the aryl ladder polymer is dependent upon the particular solvent chosen, the diluent which is utilized in conjunction with the solvent, the amounts of these materials, and the temperature of polymerization.

The diluent which is utilized in the process of the present invention can be described as a high molecular weight, essentially aliphatic hydrocarbon. This diluent must have a solvent attraction for the solvent utilized in the process, but little or no solvent action on the low molecular weight ladded prepolymer, hydrolyzate or higher molecular weight ladder polymer which is formed during the course of the process. Additionally, these diluents are soluble in hexane at its boiling point, have average molecular weights between about 140 and 4,000 and are liquid at least above 180° C. Among the diluents meeting this description are paraffin wax and essentially paraffinic materials sold under the trade names Nujol, Primol D, Bayol 35, and Bayol 90. Nujol, a high molecular weight white mineral oil, is an essentially paraffinic material with a viscosity, at 100° F., of 360–390 Saybolt seconds and a specific gravity at 60° F. of 0.880–0.900. Primol D, also a high molecular weight white mineral oil, contains approximately 36% naphthenes and 64% paraffins and has a viscosity of 369 Saybolt seconds at 100° F. and 54.2 Saybolt seconds at 210° F., with a specific gravity of about 0.8836 at 60° F. Bayol 35, a refined kerosene is composed of approximately 3% aromatics, 29% naphthenes, 66% paraffins, and 2% olefins, and has a viscosity of 34 Saybolt seconds at 100° F. and a specific gravity of about 0.780 at 60° F. Bayol 90, a medium molecular weight white mineral oil with a viscosity of 87 Saybolt seconds at 100° F. and 38 Saybolt seconds at 210° F., and a specific gravity of about 0.8677 at 60° F., has a composition of approximately 53% naphthenes and 47% paraffins. In general, although it is possible to achieve a slightly higher molecular weight in a slightly shorter period of time with paraffin wax, the other types of diluents described are generally to be preferred. These materials, which are all liquid at room temperature, provide handling advantages which more than offset the slightly longer time which is required to reach an equivalent intrinsic viscosity.

The temperature at which the polymerization is carried out will vary with the particular solvent employed. However, in general, a temperature of at least 200° C. must be reached to effectively polymerize the low molecular weight prepolymer or hydrolyzate. The preferred temperature with a solvent such as biphenyl, with a boiling point of 256° C., is approximately 225° C. With the higher boiling (306° C.) benzophenone, the temperature can advantageously be as high as about 250° C. In performing the polymerization the diluent must be added to the prepolymer-solvent mixture at an elevated temperature. Addition of the prepolymer to a mixture of the solvent and the diluent significantly below reaction temperature gives unsatisfactory results as insufficient solvent is present to properly swell the macromolecules of the prepolymer. If the diluent is added at a temperature below about 180° C., a hard crusty mass may be encountered with subsequent difficulty in dispersion and processing. Thus, it is preferred to add the diluent at a temperature of from about 180°–270° C.

While the polymerization is preferably carried out at about atmospheric pressure, it should be understood that a high pressure polymerization can be employed. At higher pressures lower boiling solvents and lower molecular weight diluents can be employed.

Economics dictate that as low a solvent to polymer ratio as possible should be used. However, this lower limit is influenced by handling characteristics and problems of agglomeration of the polymerizing material. With less than about one part solvent per four parts of polymer phase change can occur and produce dry crumbs which will not polymerize to the high molecular weight materials which are desired. To assure adequate processing, the ratio of solvent to organopolysiloxane should not fall below about 1:2. There is no effective maximum to the amount of solvent which can initially be present except as dictated by the economics. Thus, when a dilute solution of polymer in solvent is employed, not only is a larger reaction vessel required for a given amount of polymer, but greater quantities of diluent must subsequently be added, further reducing the capacity of the reaction vessel to produce polymer and increasing the required processing time.

When the organopolysiloxane solvent solution has been heated to at least 180° C., so that the hydrolysis solvent, if present, e.g., toluene, has been removed, the diluent can be added in a variety of ways, while continuing heating. For example, a continuous addition of diluent can be started and the addition continued until the desired amount of the diluent has been added; a series of incremental additions can be carried out; or a portion of the diluent added and, after a period of digestion, the additional diluent added either in one shot or continuously. The initial addition of too great a quantity of diluent tends to produce a gummy material due to a continuous polymer-rich phase, which is difficult to handle and which is not properly redispersable.

If it is desired to add the diluent continuously, an addition rate of 1.2 to 3.0 parts diluent per part of siloxane per hour is the desired range. Slower additions do not interfere with the processing or polymerization of the low molecular weight material, but require longer periods of time to achieve the desired intrinsic viscosity because of the extra time required to add all of the diluent. When the diluent is added at a rate faster than about 3 parts per hour, aggregation of the prepolymer to intractable masses can occur and prevent proper polymerization. With a slower rate, such as 0.3 to 0.5 part per hour, the same ultimate intrinsic viscosity is reached, but an additional 1 to 2 hours is required. When the addition of diluent is to be carried out in two stages, the initial addition is in an amount just necessary to effect a phase separation to a suspension, followed by a period of digestion. For example, it has been found that approximately 0.4 to 0.8 part of diluent per part of organopolysiloxane present can be added at once, that is, a rate greater than 30 parts per hour; this is followed by an agitation period of about 30 minutes prior to the addition of the remaining diluent at a rate of from about 1.5 to 6.0 parts per hour.

Further, the initial addition of diluent can be conducted at a slow rate, that is about 0.6 to 1.2 parts per hour until about 1 part of solvent per part of siloxane is present, and the addition rate of the diluent can then be increased up to as much as 12 to 18 parts per hour without seriously affecting the processing characteristics of the suspension or the ultimate intrinsic viscosity of the ladder polymer.

If the amount of high-boiling solvent in the original prepolymer-solvent solution is high enough, a portion of the diluent can be added prior to reaching reaction temperature. In essence, the diluent simply removes a portion of the solvent from the siloxane, thus bringing the concentration of low molecular weight material in the solvent to the originally desired level. However, this serves only to reduce equipment utilization and does not improve the final product nor aid in processing. Thus, if there is about one part of solvent per part of prepolymer initially, an amount of one part of diluent can be added immediately. Similarly, if there are about two parts of solvent per part of prepolymer present initially, an amount of about two parts of diluent can be added immediately without significant effect on processability or final intrinsic viscosity.

The basic siloxane rearrangement and condensation catalyst is preferably present in the initial organopolysiloxane-solvent solution. As previously noted, when diluent is added to a solution of organopolysiloxane and solvent containing the catalyst in the desired quanties, a phase separation occurs after the addition of a portion of the diluent, forming the suspension which allows polymerization. However, if the basic catalyst is not present during the addition, formation of a suspension may not occur, but two distinct, continuous liquid phases can form, preventing polymerization.

The following is the preferred embodiment of the invention. One part of prepolymer or hydrolyzate is dissolved in 0.5 part of biphenyl containing the designated amount of basic siloxane rearrangement and condensation catalyst. This solution is heated to approximately 225° C., during which time the toluene or other low-boiling solvent, if present, is removed by distillation. Upon reaching 225° C., and after removal of the low-boiling solvent, one of the kerosene or mineral oil diluents is added at the rate of 1.2 to 3.0 parts per hour until a total quantity of 1.5 parts of the diluent is present in the suspension.

The reaction time, following attainment of the polymerization temperature, can vary from about one up to 8–10 hours. When the ratio of materials and addition rates are within the preferred ranges given, an intrinsic viscosity peak of about 2.5–4.0 dl./g. is achieved after about six hours. With some variations, such as a slower addition rate of diluent, about 7 to 8 hours may be required to achieve the peak intrinsic viscosities. Further, if a lower intrinsic viscosity is desired than can be achieved with the particular ratio of prepolymer, solvent, and diluent, polymerization can be stopped after from about 1 to 3 hours and a lower molecular weight product recovered. Obviously, a smaller amount of diluent can also be used to achieve this result.

Following completion of the required polymerization time, regardless of the materials and method variations employed, the recovery methods are identical. The solid polymer phase can readily be separated from the continuous liquid phase either by centrifugation or filtration. A portion of the solid material recovered may consist of adsorbed diluent-rich phase. This diluent is preferably removed from the solid by solvent extraction prior to further processing. A solution of the solid is formed in a lower molecular weight solvent, such as, benzene or methylene chloride. This should be a low concentration solution of from, for example, 3% to 10%. A quantity of a low molecular weight aliphatic solvent, such as pentane or hexane, is then added to the aromatic solution, under agitation. The amount of aliphatic solvent should range from about one to two parts for each part of the aromatic solution. The ladder polymer precipitates from this mixture and can be recovered by filtration on a Buchner filter. Alternatively, the ladder polymer can be recovered, following filtration, or centrifugation from the original suspension, by continuous or batch extraction with a solvent such as xylene, pentane, or hexane.

In order that those skilled in the art may better understand the practice of the present invention, the following examples are given as illustrations. These examples should not be considered as limiting in any way the full scope of the present invention as covered in the appended claims.

Examples 1–9

A series of runs were made using biphenyl as the solvent and Primol D as the diluent. In each case the initial solution contained one part of ladder prepolymer or hydrolyzate and 0.5 part of biphenyl. In Examples 1, 3, and 4 the initial material was a phenyl ladder prepolymer contained in a concentration of 45% in toluene and having an intrinsic viscosity of 0.065. In Examples 2, 8, and 9 the starting material was a phenyltrichlorosilane hydrolyzate in a concentration of 54% in toluene. In each of the other examples the starting material was a phenyl ladder prepolymer at a concentration of 49% in toluene and with an intrinsic viscosity of 0.07 dl./g.

The ratios in Table I represent the relative amounts, by weight, of siloxane-solvent-diluent. Diluent addition in each example was begun at the reaction temperature noted. The catalyst, in each example, was 425 p.p.m., as potassium, based on the siloxane starting material, of a methanol solution of potassium hydroxide. The conditions and results of the suspension polymerization carried out in each of these examples are shown in Table I. The intrinsic viscosity shown for each of the high molecular weight ladder polymers is a measurement after six hours of heating from the start of diluent addition.

creased addition rate of diluent, viz., a correspondingly increased total time required.

In Examples 5–7, the effect of an increased diluent ratio in the final suspension is shown. Here, the final ratio of diluent to siloxane is 2:1, as compared with the ratio of 1.5:1 in Examples 1–4, while the solvent to siloxane ratio is maintained at the same value as before.

The result, in Examples 5–7, is a level of product intrinsic viscosity of 3.3–3.5 dl./g., significantly higher than the range of 2.6–3.1 obtained in Examples 1–4. Further, Examples 5–7 demonstrate the ability to add diluent at other than a steady rate. In Example 5 the diluent was added at a rate of 0.6 part per hour until a suspension ratio of 1:0.5:1.0 was reached and then at 12 parts per hour to the final material ratio. In Example 6 the diluent was initially added at a rate of 1.2 parts per hour until a suspension material ratio of 1:0.5:0.5 was reached, at which point the diluent addition rate was increased to 6 parts per hour. In Example 7 a rapid initial addition of diluent was made to a suspension material ratio of 1:0.5:0.6, the suspension was allowed to gain equilibrium over a period of 30 minutes and the diluent addition was then continued at a rate of 1.5 parts per hour.

Examples 8 and 9 illustrate the effect of polymerizing at temperatures substantially below the desired reaction temperature. The method of processing and material ratio were exactly the same in Examples 8 and 9 as in Examples 1 and 2, but resulted in a substantially lower molecular weight ladder polymer. To show that an essentially constant intrinsic viscosity had been reached and that the lower intrinsic viscosity was not simply the result of a longer time to reach the ultimate intrinsic viscosity, heating of the suspension in Example 9 was continued for an additional nine hours. After a total of fifteen hours heating at 180° C., the intrinsic viscosity had risen from 1.3 dl./g. at six hours to only 1.4 dl./g.

TABLE I.—SILOXANE-BIPHENYL-PRIMOL D SYSTEM

| Example | Siloxane-Solvent-Diluent | | Rate of Addition (Parts per Hr.) | Polymerization Temperature (° C.) | Intrinsic Viscosity (dl./g. in benzene at 25° C.) |
|---|---|---|---|---|---|
| | Initial Ratio | Final Ratio | | | |
| 1 | 1–0.5–0 | 1–0.5–1.5 | 1.2 | 225 | 3.1 |
| 2 | 1–0.5–0 | 1–0.5–1.5 | 1.2 | 225 | 2.9 |
| 3 | 1–0.5–0 | 1–0.5–1.5 | 3.0 | 225 | 2.9 |
| 4 | 1–0.5–0 | 1–0.5–1.5 | 0.3 | 225 | 2.6 |
| 5 | 1–0.5–0 | 1–0.5–2.0 | (1) | 225 | 3.3 |
| 6 | 1–0.5–0 | 1–0.5–2.0 | (2) | 225 | 3.3 |
| 7 | 1–0.5–0 | 1–0.5–2.0 | (3) | 225 | 3.5 |
| 8 | 1–0.5–0 | 1–0.5–1.5 | 1.2 | 200 | 1.9 |
| 9 | 1–0.5–0 | 1–0.5–1.5 | 1.2 | 180 | 1.3 |

[1] Diluent added at a rate of 0.6 part per hour to a ratio of 1–0.5–1.0, then at 12 parts per hour to the final ratio.
[2] Diluent added at a rate of 1.2 parts per hour to a ratio of 1–0.5–0.5, then at 6 parts per hour to the final ratio.
[3] Diluent added at a rate of about 42 parts per hour to a ratio of 1–0.5–0.6, and, after 30 minutes agitation, addition was continued at a rate of 1.5 parts per hour to the final ratio.

A comparison of Examples 1 and 2, run under the same conditions, shows the reproducibility of the ultimate intrinsic viscosity of the ladder polymer. As a check, to show that polymerization is essentially complete at six hours, heating was continued on the suspension of Example 2 for an additional nine hours. At this point, the intrinsic viscosity of the ladder polymer had risen to only 3.2 dl./g. Example 3, which differed from Examples 1 and 2 only in that the diluent addition rate was at the upper end of the preferred range, again shows the reproducibility of the suspension polymerization process of the present invention.

In Example 4, the diluent addition rate was well below that used even in Examples 1 and 2. Thus, the intrinsic viscosity of the polymer at 6 hours was only 2.6 dl./g. However, a determination of the intrinsic viscosity after 8 hours of heating gave a value of 3.1 dl./g., corresponding very favorably with the determined intrinsic viscosities in Examples 1–3 and clearly showing the effect of a decreased addition rate of diluent, viz., a correspondingly

Examples 10–18

Another series of runs were made utilizing benzophenone as the solvent and a paraffin wax as the diluent. In each case the starting material was a prepolymer with an intrinsic viscosity of 0.07 dl./g. contained in an amount of 49% in a toluene solution. The catalyst consisted of 425 p.p.m. of potassium hydroxide, based on the amount of starting siloxane, in each example. In each of Examples 10–18, the diluent addition was begun when the reaction temperature had been reached and was continued at the indicated rate until the final ratio was achieved. The polymerization conditions and results are shown in Table II. Again, the ratios shown in the table indicate siloxane-solvent-diluent amounts, by weight, and the intrinsic viscosity of the high molecular weight ladder polymer is after six hours of heating from the start of diluent addition.

TABLE II.—SILOXANE-BENZOPHENONE-PARAFFIN SYSTEM

| Example | Siloxane-Solvent-Diluent | | Rate of Addition (Parts per Hr.) | Polymerization Temperature (° C.) | Intrinsic Viscosity (dl./g. in benzene at 25° C.) |
|---|---|---|---|---|---|
| | Initial Ratio | Final Ratio | | | |
| 10 | 1-0.5-0 | 1-0.5-3.0 | 1.8 | 250 | 6.0 |
| 11 | 1-0.5-0 | 1-0.5-3.0 | 6.0 | 250 | 4.4 |
| 12 | 1-0.5-0 | 1-0.5-3.0 | 1.8 | 225 | 3.2 |
| 13 | 1-0.5-0 | 1-0.5-3.0 | 1.8 | 200 | 3.3 |
| 14 | 1-0.5-0 | 1-0.5-2.0 | 1.8 | 250 | 5.7 |
| 15 | 1-0.5-0 | 1-0.5-2.0 | 4.0 | 250 | 3.5 |
| 16 | 1-0.5-0 | 1-0.5-2.0 | 0.36 | 250 | 3.8 |
| 17 | 1-0.5-0 | 1-0.5-1.0 | 1.8 | 250 | 3.8 |
| 18 | 1-0.33-0 | 1-0.33-1.32 | 1.3 | 250 | 5.9 |

In Example 11, with the same initial and final ratios and the same polymerization temperature as in Example 10, the final intrinsic viscosity is significantly lower. This can be attributed to the addition rate of 6.0 parts per hour of diluent, well beyond the preferred rate of addition. Example 12 again illustrates the effect of a temperature lower than the desired temperature. Here, the ratios of material and rates of addition are the same as in Example 10, but with a reaction temperature of 225° C. as compared with 250° C., the intrinsic viscosity of the final material is little more than half that of Example 10. However, as shown in Example 13, the effect of a lower temperature with a benzophenone-paraffin system is not as striking as with the Primol D-biphenyl system, at least within limits. Example 13 is run under the same condition as Example 12 except that the temperature is reduced an additional 25° to 200° C. Again, as in Example 9, continuous heating of the suspension was continued for an additional nine hours to be certain that peak intrinsic viscosity had been reached. The intrinsic viscosity of the material of Example 14 following fifteen hours of heating in suspension was again 3.3 dl./g.

The effect of a lower diluent:solvent ratio is shown in Examples 14–16. The diluent:solvent ratio in these examples is 4:1 as compared with the ratio of 6:1 in Examples 10–11 and a significant decrease in intrinsic viscosity is noted. However, as can be seen, the intrinsic viscosity of the final ladder polymer is significantly higher than in Examples 5 and 6 where the diluent:solvent ratio is the same but biphenyl and Primol D are used in place of benzophenone and paraffin. This illustrates the differences in the various solvent:diluent couples.

In Example 15 the lower final intrinsic viscosity can be explained by the addition rate of the diluent which is above the preferred addition rate. Similarly, in Example 16 the intrinsic viscosity of the material after six hours is significantly below the intrinsic viscosity of the material in Example 14. This, as in Example 4, can be explained by the addition rate whcih is significantly lower than the preferred rate. A sample of the material of Example 16 was taken after seven hours of heating and was found to have an intrinsic viscosity of 5.5 dl./g., corresponding well with the intrinsic viscosity of the material in Example 14 which was run under identical conditions except for the addition rate of the diluent. Again, this shows that with a slower addition rate polymerization and processability are not affected, but a longer time is required to reach equilibrium.

The effect of a lower diluent:solvent ratio, while maintaining a siloxane:solvent ratio of 2:1 is shown by Example 17. By decreasing the final diluent:solvent ratio from 4:1, as in Example 14, to 2:1 in Example 17, while maintaining the siloxane:solvent ratio and the rate of diluent addition, a decrease in final intrinsic viscosity from 5.7 to 3.8 is noted. Thus, the smaller amount of diluent has abstracted less solvent from the siloxane-rich phase, and the final siloxane concentration is lower here than in Example 14.

Example 18 illustrates the effect of a lower solvent:siloxane ratio (1:3), in combination with a lower diluent:siloxane ratio (1.32:1) so that the diluent:solvent ratio is maintained at 4:1, as in Examples 14–16. The intrinsic viscosity of 5.9 dl./g., compares closely with the value of 5.7 dl./g. in Example 14, where the total diluent addition time was similar to that of Example 17.

*Examples 19–24*

A third series of runs was made utilizing biphenyl as the solvent and Bayol 90 as the diluent. In each of these runs a rapid initial addition of part of the diluent was made, followed by a slower addition of the rest of diluent to the final ratio. Each of the runs was made at 225° C. and, again, the ratio figures indicate the relative amounts of siloxane-solvent-diluent, by weight. The catalyst was 425 p.p.m. of potassium hydroxide, based on the amount of siloxane, and the starting material was a 49% toluene solution of a ladder prepolymer having an intrinsic viscosity of 0.07 dl./g. Table III shows the conditions of polymerization and the intrinsic viscosity of the high molecular weight ladder polymer after heating for six hours from the start of diluent addition.

TABLE III.—SILOXANE-BIPHENYL-BAYOL 90 SYSTEM

| Ex. | Siloxane-Solvent-Diluent | | | Addition Rate (final diluent, parts per Hr.) | Intrinsic Viscosity (dl./g. in benzene at 25° C.) |
|---|---|---|---|---|---|
| | Initial Ratio | Intermediate Ratio | Final Ratio | | |
| 19 | 1-0.5-0 | 1-0.5-0.6 | 1-0.5-2.0 | 1.5 | 2.9 |
| 20 | 1-0.5-0 | 1-0.5-0.6 | 1-0.5-2.0 | 3.0 | 2.6 |
| 21 | 1-0.5-0 | 1-0.5-0.6 | 1-0.5-2.0 | 6.0 | 2.6 |
| 22 | 1-0.5-0 | 1-0.5-0.6 | 1-0.5-2.0 | 42.0 | 2.0 |
| 23 | 1-0.5-0 | 1-0.5-0.5 | 1-0.5-2.0 | 3.0 | 2.8 |
| 24 | 1-0.5-0 | 1-0.5-0.3 | 1-0.5-2.0 | 3.0 | 2.6 |

Examples 19–21 illustrate that at a ratio of 1:0.5:0.6 a phase change has just been reached and thus, that subsequent additions of diluent of from within the otherwise preferred range of 1.2–3.0 parts per hour up to 6.0 parts per hour, well beyond the range, have no significant affect upon the ultimate final viscosity of the ladder polymer. On the other hand, as shown by Example 22, although a phase change has been reached by a ratio of 1:0.5:0.6, an extremely high subsequent addition rate will prevent attainment of full polymerization of the ladder polymer within the normal reaction time.

Further, as shown in Examples 23 and 24, a rapid addition to a ratio below 1:0.5:0.6 followed by an addition rate at the upper end of the preferred range has no significant affect on the final intrinsic viscosity of the ladder polymer.

*Examples 25–26*

A series of runs utilizing biphenyl as the solvent and Nujol as the diluent again illustrates that, within a limited range, departing from the preferred temperature does not significantly affect the intrinsic viscosity of the ladder polymer. The catalyst was 425 p.p.m. of potassium hydroxide, based on the amount of siloxane, and the starting material was a 49% toluene solution of a ladder prepolymer having an intrinsic viscosity of 0.07 dl./g. Table IV shows the conditions of the polymerization and the intrinsic viscosity of the high molecular weight ladder polymer after heating for six hours from the start of diluent addition.

TABLE IV.—SILOXANE-BIPHENYL-NUJOL SYSTEM

| Example | Siloxane-Solvent-Diluent Initial Ratio | Siloxane-Solvent-Diluent Final Ratio | Rate of Diluent Addition (Parts per Hr.) | Polymerization Temperature (° C.) | Intrinsic Viscosity (dl./g. in benzene at 25° C.) |
|---|---|---|---|---|---|
| 25 | 1-0.5-0 | 1-0.5-3.0 | 1.8 | 225 | 3.7 |
| 26 | 1-0.5-0 | 1-0.5-3.0 | 1.8 | 250 | 3.7 |

*Example 27*

A suspension polymerization was performed utilizing a prepolymer with an intrinsic viscosity of 0.07 dl./g. and contained in a toluene solution in an amount of 49%. A quantity of one part of this prepolymer was placed in 0.5 part of diphenyl ether containing 450 p.p.m., based on the siloxane, of potassium hydroxide, and heating begun, with agitation. When the temperature reached 180° C., paraffin wax addition was begun at the rate of two parts per hour until a final ratio of 1:0.5:2.0 was attained. Heating was continued to a temperature of 250° C. and the suspension was heated for 5 hours at this temperature, after completion of the addition. A sample of the ladder polymer showed an intrinsic viscosity of 2.3 dl./g.

The polymers produced according to the present invention are useful in the preparation of high temperature laminates, as by dipping various organic or inorganic porous materials, such as glass wool, glass cloth, asbestos cloth, polyethylene terephthalate film, etc., in solutions of the ladder polymer, super-imposing layers of the coated and/or impregnated materials upon each other, and pressing at elevated temperature of the order of about 200° C. to 350° C., at pressures ranging, for instance, from about 5–5,000 p.s.i. Such laminates can be in the form of panels used for electrical insulation, insulating tapes, etc., and can also be formed and used as nose cones for rockets and other projectiles which are subjected to high temperatures as supersonic speeds. Because of the resistance to temperature exhibited by the compositions produced by the present invention, one can mold canopies of these materials (with or without reinforcing structures) to be used on jet airplanes. These canopies are employed to protect the pilot when traveling at speeds at which the friction of air causes excessive increases in temperature on the surface of the canopy, thus rendering useless materials ordinarily employed for canopy purposes as, for instance, polymethylmethacrylate.

Further, mufflers and tail pipes of automobiles can be coated inside and out with solutions of the ladder polymers and the solvent evaporated to leave behind a heat-resistant and corrosion-resistant film which can increase the life of these automobile parts. In addition, solutions of the ladder polymers can be applied to ovens and ranges and the solvent evaporated to give, again, a heat-resistant surface which also minimizes the adhesion of many foodstuffs which may be inadvertently spilled on, or come in contact with, the treated oven surface.

What I claim as new and desire to secure by Letters Patent of the United States is:

1. A process for making a high molecular weight organopolysiloxane containing an average of from 1.0 to 1.1 silicon-bonded organic groups per silicon atom and having an intrinsic viscosity in benzene at 25° C. of at least 0.4 dl./g., comprising:
   (1) forming a solution containing:
      (a) a low molecular weight organopolysiloxane selected from the class consisting of prepolymers composed of form 90 to 100 mol percent of organosiloxy units of the formula:

$RSiO_{3/2}$ where R is an aryl radical, and from 0 to 10 mol percent of organosiloxy groups selected from the class consisting of:

$R'R''SiO$, $R'[CN(CH_2)_m]SiO$,
   $R'''SiO_{3/2}$, and $CN(CH_2)_mSiO_{3/2}$ where R' and R'' are selected from the class consisting of aryl radicals, alkyl radicals, and alkenyl radicals, R''' is a lower alkyl radical of from 1 to 4 carbon atoms, and m is an integral number of from 1 to 4 inclusive, octaphenylsilsesquioxane, and hydrolyzates of a trifunction aryl silane with up to 10 mol percent of at least one silane selected from the class consisting of:

$R'R''SiCl_2$, $R'[CN(CH_2)_m]SiCl_2$,
   $R'''SiCl_3$, and $CN(CH_2)_mSiCl_3$ where R', R'', R''', and m are as previously defined, contained in a low boiling solvent which has a boiling point below about 180° C. and is present in an amount of up to 10 parts per part of low molecular weight polysiloxane, by weight, and
      (b) an aromatic material having a solvent action on both the low and high molecular weight organopolysiloxanes, having a boiling point of at least 200° C., and having a maximum melting point of at least 100° C.,
   (2) adding from 0.001% to 0.5%, by weight, of a basic siloxane rearrangement and condensation catalyst,
   (3) heating the mixture to a temperature of at least 180° C. to remove the low boiling solvent, and
   (4) heating at a temperature of from 180° C. to 270° C. while adding, in controlled quantities a diluent which has a solvent attraction for the aromatic material, but no solvent action toward the organopolysiloxanes, said diluent being an essentially aliphatic hydrocarbon which is soluble in hexane at the boiling point of hexane, which has an average molecular weight between about 140 to 4,000 and which is liquid at least above 180° C., the quantity of said diluent being controlled so as to effect polymerization of the low molecular weight organopolysiloxane.

2. The process of claim 1 wherein the aromatic material is selected from the class consisting of benzophenone, biphenyl, and diphenyl ether.

3. The process of claim 1 wherein the diluent is added at a rate of from 1.2 to 3.0 parts per hour, per part of siloxane.

4. The process of claim 1 wherein the diluent is selected from the class consisting of kerosenes, white mineral oils, and paraffin wax.

5. The process of claim 1 wherein the solvent is biphenyl and the diluent is a white mineral oil.

6. The process of claim 1 wherein the solvent is diphenyl ether and the diluent is a paraffin wax.

7. The process of claim 1 wherein the solvent is benzophenone and the diluent is a paraffin wax.

8. The process of claim 1 wherein said aromatic material is selected from the class consisting of benzophenone, biphenyl, and diphenyl ether and wherein said diluent is selected from the class consisting of kerosenes, white mineral oils, and paraffin wax.

(References on following page)

References Cited

UNITED STATES PATENTS

| | | | |
|---|---|---|---|
| 3,017,385 | 1/1962 | Sprung et al. | 260—46.5 |
| 3,017,386 | 1/1962 | Brown et al. | 260—46.5 |
| 3,162,614 | 12/1964 | Katchman | 260—46.5 |
| 3,175,994 | 3/1965 | Katchman et al. | 260—46.5 |
| 3,294,738 | 12/1966 | Krantz | 260—46.5 |

DONALD E. CZAJA, *Primary Examiner.*

M. I. MARQUIS, *Assistant Examiner.*